Feb. 1, 1949.                G. W. HARRIS                2,460,453
                              SAFETY HANGER
                            Filed Oct. 9, 1944
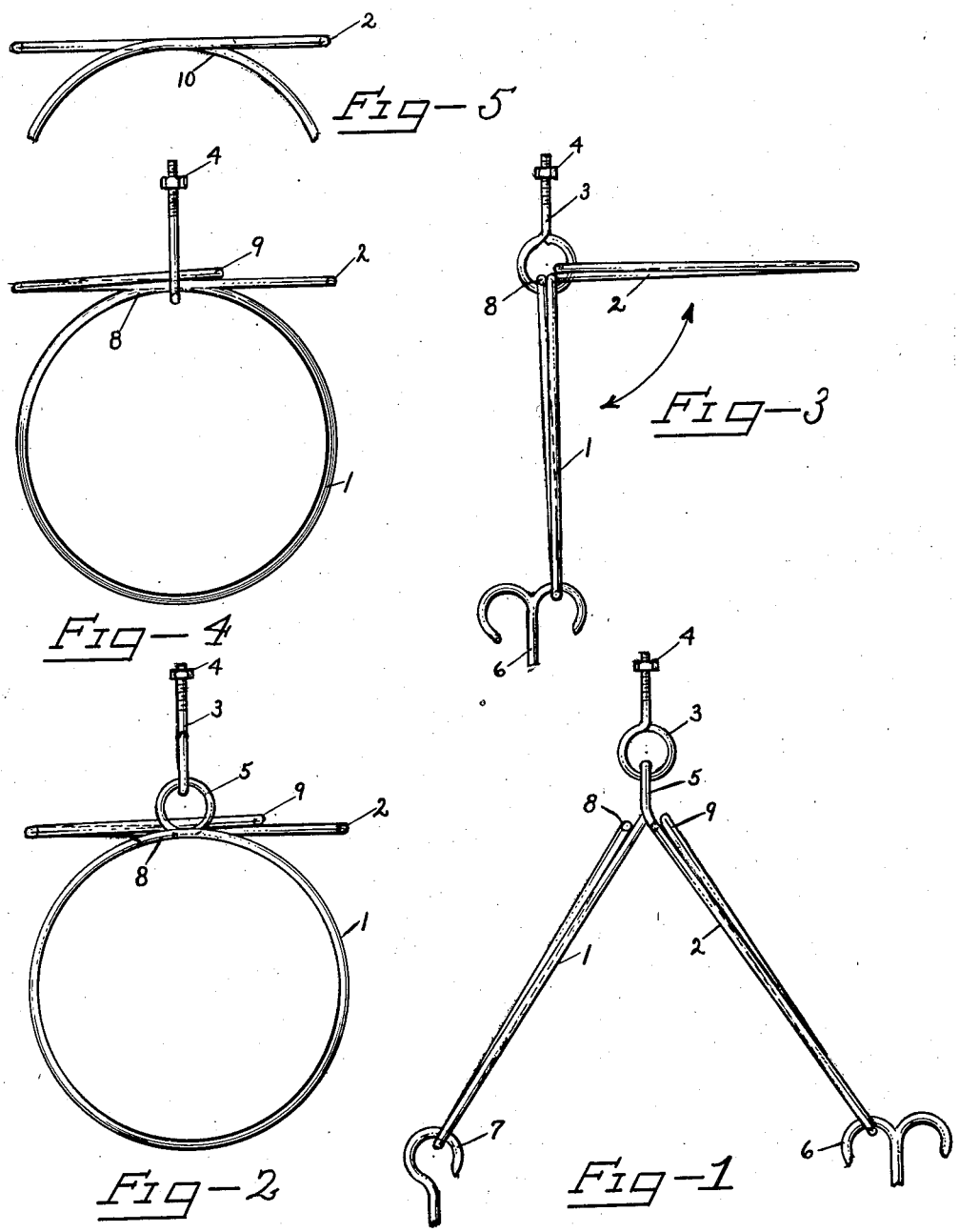
INVENTOR.
George W. Harris,
BY Bush & Bush,
His Attorneys.

Patented Feb. 1, 1949

2,460,453

UNITED STATES PATENT OFFICE 2,460,453

SAFETY HANGER

George W. Harris, Mercer County, Ill., assignor of one-half to Rudolph Miller, Matherville, Ill.

Application October 9, 1944, Serial No. 557,892

5 Claims. (Cl. 211—119)

My invention relates to an improvement in hangers.

The objects of my invention are to provide an improved safety hanger for use on chain and other conveyors such as are commonly used in foundries to carry heavy castings from one place to another; to provide such a hanger that will carry two loads instead of one; to provide such a hanger in a form which will increase its convenience in hooking on or taking off a load, and will avoid danger to the fingers or hands of the operator.

I accomplish these objects by the means illustrated in the accompanying drawings, in which—

Figure 1 shows an edge view of my hanger with an intermediate loop and showing both rings loaded;

Figure 2 shows a side view of the form shown in Figure 1;

Figure 3 shows an edge view of my hanger without the intermediate loop and with one ring loaded and the other ring standing in a convenient position for loading;

Figure 4 shows a side view of the hanger in the position shown in Figure 3;

Figure 5 is a detail showing an alternate way of forming the rings.

My hanger is preferably formed of a single bar of steel bent to form two rings 1 and 2 at the opposite ends thereof and with the middle of the bar twisted or turned so that the rings stand at right angles to each other. Each ring may be formed with the free end of the bar overlapping the adjacent portion of the ring as shown at 8 and 9 in Figure 4 or may be formed with the free ends of the rings beveled and underlapping the adjacent portion of the ring as shown at 10 in Figure 5.

The free ends of the rings may be welded or spot-welded to the bodies of the rings or united thereto in any desired way, but when the hanger bars are made of heavy enough material, it will not be necessary to fasten the free ends 8 and 9 of the rings to the bodies thereof.

The hanger is preferably formed of a single bar of iron or steel which may be round, square or of any desired shape in section. To form the first ring, one end of the bar is bent in a circle in any direction, for instance vertical, and the other end of the bar is bent in a corresponding circle standing at approximately a right angle to the first circle. The precise degree of angle is not essential, as any angle from approximately 60° to approximately 90° will facilitate attachment of the loads, but I prefer to have the two rings stand at right angles so that when one ring is horizontal, the other will be vertical as shown in Figure 3.

At the junction of the two rings, they are embraced or secured in an eyebolt 3 or other suitable hanger, the other end of which is ordinarily secured in a link of a chain or other conveyor by a nut 4. This connection with the conveyor chain may be of any desired form.

If desired, a portion of the hanger bar intermediate the rings, may be formed into a loop or ring 5 as shown in Figures 1 and 2, as a convenient means for attaching the eyebolt 3.

The hangers in common use comprise a single ring ordinarily four or five inches in diameter and when the operator attempts to hook onto such rings the chains by which the heavy castings are carried, it is necessary for him to use the fingers of one hand to turn the ring from a vertical to a horizontal or diagonal position in order to conveniently insert the hook of such chain into the hanger and in so doing, it often happens that the fingers of the operator are injured and the operation takes longer than if the hanger rings were not hanging in a vertical position.

With my device, the operator can take hold of one of the rings for the purpose of moving the other ring into a horizontal position in which it will be easy to attach the chain hook, without danger to the fingers.

As soon as one chain has been attached to one of the rings, the weight of the chain or the load of castings will draw that ring into a vertical position as shown in Figure 3, and put the other ring automatically in a horizontal position in which it will be an easy matter for the operator to attach the chain hook of another casting. In this way the same hanger can be utilized to carry double the load which the single rings now in use will permit.

When the hanger is free of any load, it will stand in the position shown in Figure 1 so that an operator can attach the chain hook of the casting readily without being obliged to move or change the position of the hanger, thus facilitating the attachment of the load to the hanger and avoiding any danger of injury to the fingers of the operator.

I make no claim to any particular form of eyebolt or hook. Various modifications may be made in forming the rings and in attaching the free ends thereof and I do not limit my claims to the precise forms shown in the drawings.

My apparatus may be used advantageously with a single hook as shown at 7 in Figure 1 or with a double hook 6 as shown in Figures 1 and 3. The double hooks are in common use in handling castings in order to permit the attachment of the load to a separate hoist by which the load is lifted so as to release it from the hanger rings.

In raising the hook 6 will permit the hanger to swing into a position from which the hook will be automatically released from the right thus facilitating the detachment of the load from the ring and avoiding any necessity of the operator holding the ring in order to unload it.

It is obvious that the rings and hooks may be made of any size most convenient for the particular work to be handled and various modifications may be made in the size, proportions and shape of the rings without departing from the spirit of my invention. Thus the rings may be either round or elliptical or oval shaped or even rectangular or triangular and in the claims I use the words "rings" and "links" in their broadest sense to include the different shapes mentioned.

I make no claim for any particular form of hook for attaching the load nor for any particular form of eyebolt or other member by which the hanger is carried by the conveyor, as various forms of hooks and carriers are in common use and well known.

It is obvious that the most desirable angle at which the hanger rings are to be secured to each other will depend to some extent upon the loads to be carried and the size and shape of the hooks upon the free ends of the chains attached to the ends of the loads. When arranged at an angle of 90°, the rings will normally stand at an angle at 45° to the vertical and in this position the hook of the load-carrying chain can readily be attached to either one of the rings without the necessity of the operator holding the ring in any particular position. When a load is thus attached to one ring, the downward pull of the load upon that ring will cause the other ring to stand at right angles or in a horizontal position and the second hook can be attached to the horizontal ring. With smaller loads or smaller hooks, the rings will not be obliged to diverge at so great an angle.

I claim:
1. A duplex safety hanger for heavy loads comprising an overhead support, a pair of rings suspended thereby and pivotally mounted therein, said rings being rigidly united and diverging from the support.

2. A duplex safety hanger for heavy loads comprising an overhead support having a depending eye, a pair of rings passing through the eye and free to swing from the eye, said rings being rigidly united to each other at the eye and diverging laterally.

3. A duplex safety hanger for heavy loads comprising an overhead support, a pair of rings rigidly united to each other at one point and diverging laterally therefrom, means whereby said rings are pivotally united to the overhead support whereby the rings are free to swing laterally under the overhead support.

4. A duplex safety hanger comprising an overhead support carrying an eye, a pair of diverging rings formed integrally from a single bar of metal with an intermediate ring formed from the same bar between the other rings and arranged to pass through and be carried by the eye, said intermediate ring being free to swing therefrom.

5. A duplex safety hanger for heavy loads comprising an overhead support, a pair of rings suspended thereby and pivotally mounted therein, said rings being rigidly united and diverging outwardly from each other.

GEORGE W. HARRIS.

REFERENCES CITED

The following references are of record in the file of this patent:

UNITED STATES PATENTS

| Number | Name | Date |
|---|---|---|
| 313,410 | Eckert et al. | Mar. 3, 1885 |
| 331,717 | Kessel | Dec. 1, 1885 |
| 568,711 | Bachrach | Sept. 29, 1896 |
| 727,591 | Cook | May 12, 1903 |
| 1,027,138 | Mayo | May 21, 1912 |
| 1,728,249 | Nagle | Sept. 17, 1929 |
| 1,753,640 | Baker | Apr. 8, 1930 |
| 1,833,234 | Skoglund | Nov. 24, 1931 |
| 1,902,512 | Mehl | Mar. 21, 1933 |
| 2,139,294 | Weigant | Dec. 6, 1938 |